(12) United States Patent
Antide et al.

(10) Patent No.: US 12,436,258 B2
(45) Date of Patent: Oct. 7, 2025

(54) RADAR MEASURING DEVICE AND METHOD WITH DUAL RADAR SIGNAL GENERATION

(71) Applicant: COMMISSARIAT A L'ENERGIE ATOMIQUE ET AUX ENERGIES ALTERNATIVES, Paris (FR)

(72) Inventors: Etienne Antide, Grenoble (FR); Mykhailo Zarudniev, Grenoble (FR); David Lachartre, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 476 days.

(21) Appl. No.: 17/870,166

(22) Filed: Jul. 21, 2022

(65) Prior Publication Data

US 2023/0082258 A1    Mar. 16, 2023

(30) Foreign Application Priority Data

Jul. 29, 2021 (FR) ...................... 21 08255

(51) Int. Cl.
*G01S 13/34* (2006.01)
*G01S 7/35* (2006.01)

(52) U.S. Cl.
CPC ............ *G01S 13/348* (2013.01); *G01S 7/354* (2013.01)

(58) Field of Classification Search
None
See application file for complete search history.

(56) References Cited

U.S. PATENT DOCUMENTS 10,727,849 B2    7/2020  Jany et al.
2020/0091921 A1   3/2020  Jany et al.
(Continued)

FOREIGN PATENT DOCUMENTS

FR    3 086 132 A1    3/2020

OTHER PUBLICATIONS

French Preliminary Search Report issued Apr. 13, 2022 in French Application 21 08255 filed on Jul. 29, 2021, citing documents AA-AC therein, 2 pages (with English Translation of Categories of Cited Documents).

(Continued)

*Primary Examiner* — Whitney Moore
(74) *Attorney, Agent, or Firm* — Oblon, McClelland, Maier & Neustadt, L.L.P.

(57) ABSTRACT

Radar measuring device including:
a first generator of a first periodic radar signal whose frequency varies linearly, over at least one portion $T_{ramp}$ of a period $T_{in}$, in a frequency band B;
a transmit antenna coupled to an output of the first generator and configured to transmit the first radar signal;
a second generator of a second periodic radar signal whose frequency varies linearly, over said portion $T_{ramp}$ of the period $T_{in}$, in the frequency band B, which is generated with the same start-up phase as the first radar signal and having, relative to the first radar signal, a configurable delay $\tau_{mix}$;
a receive antenna configured to receive at least one echo of the first radar signal;
a mixer comprising a first input coupled to the receive antenna and a second input coupled to an output of the second generator.

20 Claims, 6 Drawing Sheets

(56) References Cited

U.S. PATENT DOCUMENTS

2021/0165088 A1 6/2021 Suzuki
2021/0173069 A1 6/2021 Wu et al.
2021/0181328 A1 6/2021 Hayashi

OTHER PUBLICATIONS

Guermandi et al., "A 79GHz 2×2 MIMO PMCW radar SoC in 28nm CMOS", 2016 IEEE Asian Solid-State Circuits Conference (A-SSCC), 2016, pp. 105-108.

RADAR MEASURING DEVICE AND METHOD WITH DUAL RADAR SIGNAL GENERATION

TECHNICAL FIELD

This document relates to radar applications, in particular short-range and high spatial resolution radar applications. It relates in particular to a radar measuring device forming a radar transceiver system architecture jointly proposing a low energy consumption, a high spatial resolution and a high signal-to-noise ratio. It also relates to a radar measuring method implemented with such a device.

Prior Art

The radar approach called FMCW ("Frequency Modulated Continuous Waveform") is based on the transmission and reception of frequency modulated continuous signals. This technique is currently opposed to the UWB (Ultra-Wide Band) type radar approaches which use very short pulses to generate wide band signals.

The FMCW approach is preferred in applications in the automotive sector operating in the 77 GHz frequency band, in gesture recognition, or even applications for supervising respiratory and heart rates (vital signs) because of the following advantages it has:
- a low computational complexity, because this approach relies on low sampling rate converters;
- a simplicity of generation of waveforms respecting a spectral emission mask as imposed by the radio standards.

An example of a signal used by an FMCW radar is shown in the time domain and in a time-frequency plane in FIG. 1. Such a signal, called "chirp", linearly sweeps a band of frequencies B, around a carrier frequency, or centre frequency, $f_c$ for a duration $T_{ramp}$. The ability of an FMCW radar to distinguish between two reflectors, that is to say two elements (objects, people, etc.) on which the transmitted radar signal is reflected and which return a portion of the energy of the transmitted radar signal, by a single observation of their distance from the radar (distance called "range") is called "spatial resolution", denoted $\Delta R$, and is linked to the value of the frequency band B swept by the chirp by the relationship:

$$\Delta R \geq \frac{c}{2B}$$

in which "c" corresponds the speed of light in vacuum.

In applications for tracking people, this spatial resolution must not exceed about 10 cm in order to be able to distinguish individuals which are potentially close to each other, which makes it necessary to use chirps of frequency band B equal to several gigahertz. Such frequency bands are authorised by international regulations managing spectral allocations in millimetre frequency bands, thus constraining the choice of carrier frequency $f_c$.

In operation, a distance R separating a reflector from the radar is determined by measuring a flight time $\tau$ of the transmitted radar signal, that is to say the time it took for this signal to travel twice this distance (a round trip, from the radar to the reflector, then after reflection, from the reflector to the radar). This flight time $\tau$ is expressed by the relationship:

$\tau = 2R/c$

Thus, for short-range applications where the maximum distances to be measured are a few tens of meters at most, the detected flight times are a few hundred nanoseconds. For example, a reflector placed at R=15 m is associated with a flight time $\tau$=100 ns.

The principle of the FMCW radar is to emit chirps whose durations are much longer relative to the flight times to be measured, typically several tens or hundreds of microseconds. The FMCW radar simultaneously performs the operations of transmitting the radar signal and receiving its echoes reflected by the different objects present in the scene which is measured by the radar. The instantaneous frequency difference (at the same time t) between the chirp transmitted at t=0 (designated in FIG. 1 by the reference 10) and an echo received at t=$\tau$ (designated in FIG. 1 by the reference 12), called "beat frequency" or "IF", is proportional to the delay $\tau$ to be measured. To detect delay values of a few nanoseconds, the IF frequencies associated with these delays are measured in the radar output signal. If the chirps can sweep frequency bands B of multiple gigahertz, much smaller sampling frequencies, typically less than 10 MHz, are used to identify the IF frequencies which compose the output signal of an FMCW radar.

When an FMCW radar is used to carry out a monitoring of the vital signs of individuals, and more specifically a monitoring of their respective respiratory and heart rates, these vital signs are responsible for small movements of their rib cages. The distance at which a subject detected by the radar varies with these chest movements. In the case of a heart rate monitoring, the variation in distance "dr" to be measured is in the range of 0.5 mm at a frequency between 1 Hz and 5 Hz. In the case of a breathing rate monitoring, the variation in distance "dr" to be measured is in the range of 1 cm at a frequency between 0.1 Hz and 0.5 Hz. If the distance measurement accuracy of the considered radar is not as fine, it is possible to detect such distance variations by comparing several successive distance measurements. Indeed, these distance variations dr induce phase variations $\Delta \phi$ of the IF frequency signal associated with the monitored subject by the following relationship:

$$\Delta \phi = \pm \frac{4 \cdot \pi \cdot dr \cdot f_c}{c}$$

The measurement principle applied for this type of application is therefore based on the repetition of distance measurements in order to observe the variations in the phase of the IF frequency signals over time. In order to observe the heartbeats of a subject and date their occurrences to within a few milliseconds, these distance measurements are repeated at a frequency $f_{frame}$, called "Frame Rate", of about 1 kHz.

In order to reduce the power consumption of the radar, it is possible to switch off the oscillators, amplifiers and other electronic elements of the radar between two successive measurements. It is then possible to define a "duty-cycle" $\alpha_{DC}$ of the radar, as being the ratio between the duration $T_{ON}$ where this system is active, and the total duration $T_{ON}+T_{OFF}$ ($T_{OFF}$ corresponding to the duration during which, between two measurements, the radar is off) separating two measurements, such as:

$$a_{DC} = \frac{T_{ON}}{T_{ON} + T_{OFF}} = T_{ramp} \cdot f_{frame}$$

FIG. 2 shows the characteristic f(t) (variation of the frequency as a function of time) of chirps transmitted and received with a duty cycle $\Delta_{DC}$<1.

It may be noted that the term FMCW, designating continuous frequency modulated signals, is herein used to also designate such chirps having a duty-cycle $\Delta_{DC}$<1. Such chirps are sometimes called "burst chirps".

The radar activity time $T_{ON}$ corresponds to the time required to perform a distance measurement. This time is equal to the duration of the chirp $T_{ramp}$, a time during which the transmitted and received chirps are compared to produce the IF signal of interest. The time $T_{OFF}$ is in turn determined by the value of $f_{frame}$, that is to say the rate at which the measurements are repeated. The value of $f_{frame}$ is determined by the application, and will depend on the nature of the phenomena to be observed. Since the value of $f_{frame}$ is determined by the targeted application, a reduction in the duty-cycle $\Delta_{DC}$ of the system, and therefore a reduction in its overall energy consumption, requires a reduction in the duration of the chirps $T_{ramp}$. The sum of the durations $T_{ON}$ and $T_{OFF}$ is equal to the period T of the transmitted chirp.

In order to benefit from a good phase variation dynamics $\Delta\phi$ as well as to be able to use wide bands of frequencies B, the carrier frequencies $f_c$ of the signals used are located in the millimetre band, that is to say between about 30 GHz and 300 GHz. This increase in frequency nevertheless implies that these signals will be strongly attenuated during their propagation in space. Very low received powers, and consequently low signal-to-noise ratios (SNR) are therefore expected. Since the detection probabilities of a radar signal are dependent on the SNR, it is important to have a good command of the SNR to ensure good detection performance at such carrier frequencies. It is moreover, from this same SNR, that the maximum distance detectable by the radar is defined, which justifies the need for an SNR of sufficient value.

The chirps are usually generated using Phase-Locked Loops (Pas), which allow monitoring the frequency sweep of a Voltage Controlled Oscillator (VCO) or a Digitally Controlled Oscillator (DCO). A chirp thus generated is then frequency-multiplied, to allow obtaining a B-band chirp centred about the desired carrier frequency $f_c$. However, the successive frequency multiplication operations will also increase the phase noise of the multiplied signal, which will have a negative impact on the quality of the radar signals, and therefore on the SNR. Also, the considered multiplication factors are generally less than 10 to be placed in the target millimetre band. This is why the short duration of a chirp is generally conditioned by the maximum frequency ramp slope values, designated by the variable $\alpha$ and whose value is expressed in MHz/µs, that can be reached at the PLL output. In addition, compromises have to be considered between the value of the slope $\alpha$, the linearity of the frequency ramp (which ensures constant IF frequency values and which is therefore linked to the accuracy of the distance measurement which is carried out), and the consumption.

In addition, a reduction in the duration of the chirps to sweep a given band B will have, with a conventional FMCW radar architecture, two major negative impacts.

Firstly, the values of the IF frequencies which are sought to be measured to deduce the distances travelled by the echoes of the emitted chirps depend on the duration $T_{ramp}$. Reducing this duration will increase the values of the IF frequencies associated with the different measured distances $R_k$ (corresponding to the distances of the different reflectors relative to the radar). This involves observing the radar output signals over wider acquisition bands, which would require the use of analog digital converters with a very high sampling rate (several hundred MHz), which are expensive and high energy consumption elements. The white thermal noise would be, in turn, observed and integrated over a wide observation band, resulting in high noise levels and therefore poor SNR.

Secondly, IF signals have a time-limited duration. If the duration of the chirp decreases sufficiently to be of the same order of magnitude as that of the flight times $\tau_k$ (flight times of the different received echoes), which would be the case using for example a chirp with $T_{ramp}$≤1 µs to measure delays of up to 100 ns (for objects located at a distance of 15 m), then time windowing effects, reducing the coexistence time of the transmitted signals and received echoes, must be taken into account. The simple fact of choosing to use short-duration chirps $T_{ramp}$ in front of the flight times $\tau_k$ to be detected with a conventional FMCW reception scheme will induce windowing effects which will deteriorate the IF signals at the radar output. It is important to emphasise that these effects are independent of the attenuation due to the propagation of the electromagnetic waves, but are the consequences of the signal reception process, and more specifically of the analog mixing step implemented at reception. The time windowing causes an additional attenuation of the powers of the IF signals associated with the targets furthest from the radar, which results in a non-negligible degradation of their SNR. The available energy is then insufficient to carry out the desired measurement.

DISCLOSURE OF THE INVENTION

Thus there is a need to propose a radar measuring device operating in the millimetre band, with low consumption and high signal/noise ratio, operating with radar signals of very short duration and wide frequency band.

For this, one embodiment proposes a radar measuring device including at least:
  one first generator of a first periodic radar signal whose frequency varies linearly, over at least one portion $T_{ramp}$ of a period $T_{in}$, in a frequency band B, corresponding to a first chirp;
  one transmit antenna coupled to an output of the first generator and configured to transmit the first radar signal;
  one second generator of a second periodic radar signal whose frequency varies linearly, over said portion $T_{ramp}$ of the period $T_{in}$, in the frequency band B, which is generated with a constant phase or the same start-up phase, or the same initial phase, as the first radar signal and having, relative to the first radar signal, a configurable delay $\tau_{mix}$;
  one receive antenna configured to receive at least one echo of the first radar signal;
  one mixer comprising a first input coupled to the receive antenna, a second input coupled to an output of the second generator.

This radar measuring device proposes to generate and use two distinct radar signals to carry out measurements. The first radar signal is transmitted by the measuring device. The second generated radar signal is similar to the first radar signal, but is generated after a configurable delay $\tau_{mix}$. It is this second radar signal which is mixed with the echo(es) received at the receive antenna of the radar device.

With such a configuration, good SNR values are preserved while allowing a proper operation with a low duty-cycle of the radar signals generated because the use of a second delayed radar signal distinct from the first radar signal allows the device to avoid the time windowing effects occurring in a conventional FMCW radar device. This device allows an operation with a low electrical consumption without this being detrimental to the obtained quality of detection.

The choice of the value of the delay $\tau_{mix}$ allows focusing the observation made by the radar measuring device on a desired distance range.

For example, in order to benefit from a good compromise between the need for a high carrier frequency and that of limiting the attenuation which is increasing with the rise in frequency, the device may generate first and second radar signals in the millimetre band with a high carrier frequency $f_c$ between 30 GHz and 60 GHz and for example equal to 60 GHz, authorised for the short-range radar applications, and sweeping a large frequency band B, for example equal to 7 GHz.

This device allows an operation with radar signals having low values $T_{ramp}$, for example less than or equal to 1 μs. This device allows taking advantage of the gains in consumption that the use of such short ramp duration chirps, while eliminating windowing effects, as well as avoiding an excessive increase in IF frequencies.

For applications for tracking individuals at short distance, for example the monitoring of vital signs of these individuals, the duty-cycles allowed by the architecture here proposed are much lower than those accessible by architectures of the state of the art. These low duty-cycles are moreover achieved in a system with low acquisition band (and therefore high SNR) and high bandwidth, thus jointly proposing properties of low energy consumption, high SNR and high spatial resolution.

Given that the second radar signal is generated with the same start-up phase as the first radar signal, the phase $\phi_1$ of the first signal $s1 = e^{j\phi_1(t)}$ is such that $\phi_1(t) = \phi_2(t - \tau_{mix})$, with the phase $\phi_2$ of the second signal $s2 = e^{j\phi_2(t)}$. This feature of the device is particularly advantageous when the radar measuring device is used to carry out successive measurements in order to determine a phase shift or a phase discontinuity in the obtained successive measure results, and determining a very short distance from this phase difference, e.g. when the radar measuring device is used to supervising heart rate or a respiratory rate. This is also obtained by generating the second radar signal with a constant phase.

According to a first embodiment, the radar measuring device may be such that:
the first generator includes a first polar modulator configured to receive, on a first input, a first periodic signal intended to be frequency modulated, on a second input, a first control signal comprising a digital sequence of frequency samples, on a third input, a clock signal, and to carry out a modulation of the first periodic signal by the first control signal at the frequency of the clock signal;
the second generator includes a second polar modulator configured to receive, on a first input, the first periodic signal intended to be frequency modulated, on a second input, a second control signal comprising said digital sequence of frequency samples delayed by the configurable delay $\tau_{mix}$ which is equal to an integer number of periods of the clock signal, on a third input, the clock signal, and to carry out a modulation of the first periodic signal by the second control signal at the frequency of the clock signal.

According to a second embodiment, the radar measuring device may be such that:

the first generator includes a first Cartesian modulator configured to receive, on a first input, a first periodic signal intended to be frequency modulated, on a second input, a second periodic signal intended to be frequency and quadrature modulated with the first periodic signal, on a third input, a first control signal comprising a first digital sequence of frequency samples, on a fourth input, a second control signal comprising a second digital sequence of frequency samples, on a fifth input, a clock signal, and to carry out a modulation of the first and second periodic signals respectively by the first and second control signals at the frequency of the clock signal;
the second generator includes a second Cartesian modulator configured to receive, on a first input, the first periodic signal intended to be frequency modulated, on a second input, the second periodic signal intended to be frequency and quadrature modulated with the first periodic signal, on a third input, a third control signal comprising the first digital sequence of frequency samples delayed by the configurable delay $\tau_{mix}$ which is equal to an integer number of periods of the clock signal, on a fourth input, a fourth control signal comprising the second digital sequence of frequency samples delayed by the configurable delay $\tau_{mix}$ on a fifth input, the clock signal, and to carry out a modulation of the first and second periodic signals respectively by the third and fourth control signals at the clock signal frequency.

An advantage of the first embodiment is that it can only use a single frequency synthesis element.

An output of the first (polar or Cartesian) modulator may be coupled to an input of a first frequency multiplier, the first radar signal corresponding to the signal intended to be output from the first frequency multiplier, and an output of the second (polar or Cartesian) modulator may be coupled to an input of a second frequency multiplier, the second radar signal corresponding to the signal intended to be output from the second frequency multiplier.

The radar measuring device may further include, coupled to an output of the mixer, a high pass filter which is coupled in series to a variable cut-off frequency and gain filter.

The radar measuring device may further include an analog—digital converter comprising an input which is coupled to an output of the variable cut-off frequency and gain filter.

Another embodiment relates to a radar measuring method implemented with at least one radar measuring device as proposed in this document, including at least:
selection of a first value of the configurable delay $\tau_{mix}$ of a first value $B_1$ of the frequency band B and of a first $T_{ramp}$ value;
first radar measurement implemented with the radar measuring device which is configured with the first value of the configurable delay $\tau_{mix}$ and the first value $B_1$.

The first value of the configurable delay $\tau_{mix}$ may be equal to 0, and/or the first value $B_1$ may be between 200 MHz and 2 GHz, and/or the first $T_{ramp}$ value may be between 1 μs and 10 μs.

The method may further include, after the implementation of the first radar measurement:
measurement, in the spectrum of the output signal of the radar measuring device obtained during the first radar measurement, of one or more frequency peaks $f_{IF,k}$, k being an integer which is greater than or equal to 1, each representative of the presence of at least one reflector at a given distance from the radar measuring device;

calculation, for the or each of the frequency peaks $f_{IF,k}$, of an estimate $\widehat{R_k}$ of said given distance according to the equation $$\widehat{R_k} = -\frac{f_{IF,k} \cdot T_{ramp}}{B_1} \cdot \frac{c}{2},$$

with c corresponding to the speed of light in vacuum;

selection of a second value $B_2 > B_1$ of the frequency band B;

calculation of one or more second values $\tau_{mix,k}$ of the configurable delay $\tau_{mix}$ according to the equation $$\tau_{mix,k} = \frac{2\widehat{R_k}}{c} - \frac{1}{2B_2};$$

one or more second radar measurements each implemented with the radar measuring device configured with the or one of the second value $\tau_{mix,k}$ and the second value $B_2$.

It is possible that the second radar measurements are implemented with a second $T_{ramp}$ value which is different from the first $T_{ramp}$ value used during the first radar measurement. This second $T_{ramp}$ value may be between 1 µs and 10 µs.

The radar measuring device is in this case used with an adaptive approach, and operates measurement sequences to focus on the present reflectors. It is suitable for analysing the evolution of the phase of the radar signals, and therefore allows addressing short-range detection and tracking applications.

The second value $B_2$ may be between 2 GHz and 4 GHz.

The radar measuring device may further include, after the implementation of the second radar measurement(s):

measurement, in the spectrum of the or each output signal of the radar measuring device obtained during the or each of the second radar measurements, of one or more frequency peaks $f_{IF,k}$;

calculation, for the or each of the frequency peaks $f_{IF,k}$, of an estimate $\widehat{R_k}$ of said given distance according to the equation $$\widehat{R_k} = -\frac{f_{IF,k} \cdot T_{ramp}}{B_2} \cdot \frac{c}{2}$$

selection of a third value $B_3 > B_2$ of the frequency band B;

calculation of one or more third delay values $\tau_{mix,k}$ d of the configurable delay $\tau_{mix}$ according to the equation $$\tau_{mix,k} = \frac{2\widehat{R_k}}{c} - \frac{1}{2B_3};$$

one or more third radar measurements each implemented with the radar measuring device configured with the or one of the third delay values $\tau_{mix,k}$ and the third value $B_3$.

It is possible that the third radar measurements are implemented with a third $T_{ramp}$ value different from the first $T_{ramp}$ value used during the first radar measurement and/or different from the second $T_{ramp}$ value used during the second radar measurement(s). This third $T_{ramp}$ value may be between 1 µs and 10 µs.

The third value $B_3$ may be between 4 GHz and 6 GHz.

The second radar measurement(s), or the third radar measurement(s), may be repeated at a frequency between 1 Hz and 5 Hz in the case of a method implemented to follow a heart rate, or between 0.1 Hz and 0.5 Hz in the case of a method implemented to follow a respiratory rate.

BRIEF DESCRIPTION OF THE DRAWINGS

The present invention will be better understood on reading the description of exemplary embodiments given for purely illustrative purpose and without limitation with reference to the appended drawings in which.

Figure 1:
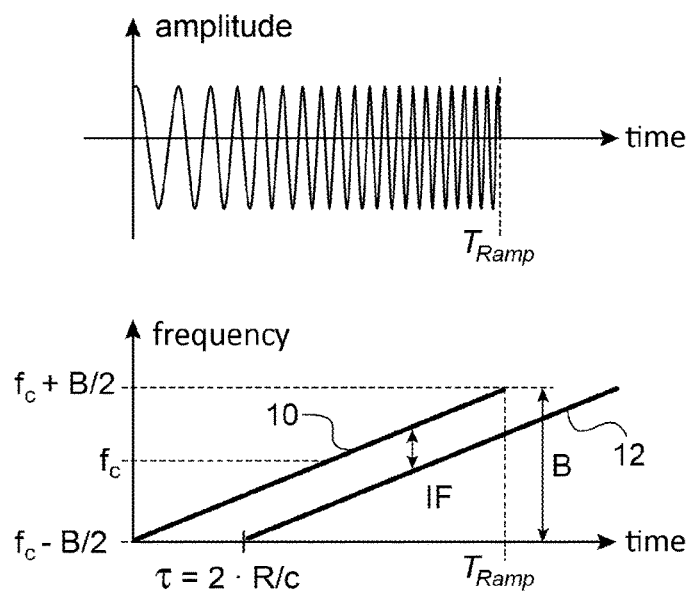
FIG. 1 shows an example of a signal used by an FMCW radar.
Figure 2:
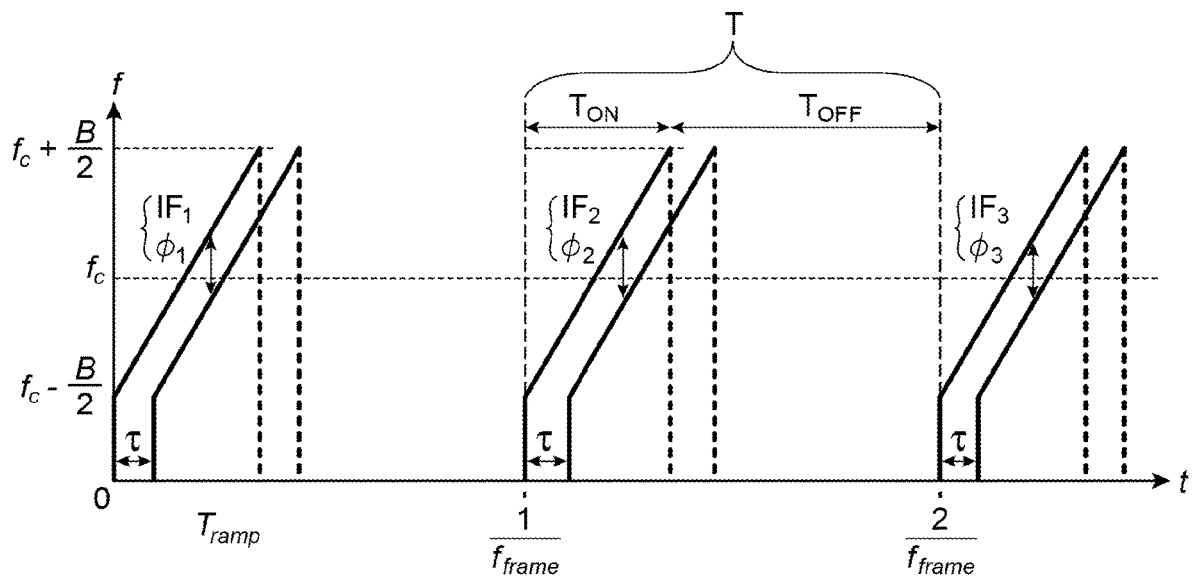
FIG. 2 shows the characteristic f(t) of chirps which are transmitted and received with a duty-cycle $\Delta_{DC} < 1$.

Identical, similar or equivalent portions of the different figures described below bear the same numerical references so as to facilitate the passage from one Figure to another.

The different parts shown in the Figures are not necessarily represented on a uniform scale, in order to make the figures more readable.

The different possibilities (variants and embodiments) must be understood not being mutually exclusive and can be combined with each other.

DETAILED DISCLOSURE OF PARTICULAR EMBODIMENTS

A radar measuring device 100 according to one embodiment is described below in connection with FIG. 3.

The device 100 includes a first generator 102 of a first periodic control voltage of frequency $f_{in}$. On each period $T_{in} = 1/f_{in}$ of this first control voltage, its amplitude varies, over a non-zero duration $T_{ON} < T_{in}$, linearly between two different values. This characteristic of this first control voltage will define the duty-cycle $\alpha_{DC}$ of the radar such that:

$$\alpha_{DC} = \frac{T_{ON}}{T_{IN}} = T_{ramp} \cdot f_{frame}$$

The device 100 further includes a first oscillator 104 receiving as input the first control voltage outputted by the first generator 102. The first oscillator 104 outputs a first radar signal of the chirp type linearly sweeping a frequency band B around a carrier frequency $f_c$ during the $T_{ramp}$ duration. The characteristic f(t) of this first radar signal is shown in FIG. 4 and designated by the reference 106.

The first generator 102 and the first oscillator 104 together form a first generator 107 of a first periodic radar signal whose frequency varies linearly, over the portion $T_{ramp}$ of the period $T_{in}$, in the frequency band B.

The device 100 also includes a power amplifier 108 receiving the first radar signal as input, and one output of which is coupled to a transmit antenna 110 of the device 100.

The elements 102, 104, 108 and 110 form the emission, or transmission, portion of the radar signal of the device 100.

The device 100 also includes a receive antenna 112 whose output is coupled to an input of a low noise amplifier 114 (or LNA). The receive antenna 112 is intended to capture the echoes of the chirps transmitted from the transmit antenna 110 and which are reflected on the reflectors present in the scene observed by the device 100. The characteristic f(t) of the one of these echoes received by the receive antenna 112 after a flight time $\tau$ is shown in FIG. 4 and designated by the reference 116.

The device 100 also includes a second generator 118 of a second periodic control voltage having characteristics (frequency $f_m$, amplitude, duration $T_{ON}$) similar to those of the first control voltage generated by the first generator 102, but delayed by a delay value $\tau_{mix}$. The value of the delay $\tau_{mix}$ is configurable. In FIG. 4, the delay $\tau_{mix}$ is shown symbolically by an element referenced 119.

The device 100 further includes a second oscillator 120 receiving as input the second control voltage outputted by the second generator 118. The second oscillator 120 outputs a second radar signal of the chirp type linearly sweeping the frequency band B around the frequency carrier $f_c$ during the $T_{ramp}$ duration. The characteristic f(t) of this second radar signal is shown in FIG. 4 and is designated by the reference 122.

The second generator 118 and the second oscillator 120 together form a second generator 123 of a second periodic radar signal whose frequency varies linearly, over the portion $T_{ramp}$ of the period $T_{in}$, in the frequency band B, which is generated with the same initial phase, or same start-up phase, as the first radar signal and which has, relative to the first radar signal, the delay $\tau_{mix}$.

The device 100 further includes a mixer 124 comprising a first input coupled to the output of the low noise amplifier 114 and a second input to which the second radar signal, output from the second oscillator 120, is applied.

The device 100 also includes a high pass filter 126 having an input which is coupled to the output of the mixer 124. The filtering parameters of the filter 126 are adjustable.

The device 100 also includes a variable cut-off frequency and gain filter 128 (or AGC for "Automatic Gain Control"), or anti-aliasing filter, comprising an input which is coupled to the output of the high pass filter 126.

These filters 126, 128 are configured to together select an acquisition band comprising the desired IF frequencies. The filter 128 allows in particular attenuating the excessively high IF frequency values, which correspond to reflectors located outside the observation window. Furthermore, the filters 126, 128 also allow filtering the noise located outside the frequency band of interest, in order to limit its impact on the signal which is then sampled by an analog digital converter 130 (or ADC) comprising an input which is coupled to the output of the filter 128. The output of the converter 130 forms the output of the device 100. By way of example, the filters 126 and 128 may be made as described in the document D. Guermandi et al., "A 79 GHz 2×2 MIMO PMCW radar SoC in 28 nm CMOS," 2016 IEEE Asian Solid-State Circuits Conference (A-SSCC), 2016, pp. 105-108, doi: 10.1109/ASSCC.2016.7844146, and more specifically as in FIG. 6 of this document.

The elements 112, 114, 118, 120, 124, 126, 128 and 130 form the reception portion of the device 100.

Thus, the device 100 includes an adaptive architecture in which, rather than using as a reference, in the reception portion, the first radar signal used for the transmission, the analog mixing operation is carried out in the mixer 124 with a second radar signal which is identical to the first transmitted radar signal (in terms of frequency, initial phase and duration) but generated after a configurable delay $\tau_{mix}$.

In this device 100, the signal obtained at the output of the mixer 124 may be expressed by the equation:

$$x_{mix}(t) = \\ V \cdot \exp\left(2j\pi\left(f_c \cdot (\tau_{mix} - \tau) + \frac{B}{2 \cdot T_{ramp}}(\tau^2 - \tau_{mix}^2) - \frac{B}{T_{ramp}} \cdot (\tau - \tau_{mix}) \cdot t\right)\right) \cdot \\ rect\left(\frac{t - \frac{T_{ramp} + \tau + \tau_{mix}}{2}}{T_{ramp} + \tau_{mix} - \tau}\right)$$

with $\sqrt{V}$ corresponding to the amplitude in volts of each of the first and second radar signals, $f_c$ the carrier frequency of the first and second radar signals, and $\tau$ the value of the flight time of the echo signal received by the device 100. The function x→rect(x/T) represents the gate function, which is 1 for any value of $x \in [-T_{in}/2; T_{in}/2]$ and 0 for the other values of x.

By way of comparison, the signal obtained at the output of a mixer of a conventional FMCW radar measuring device may be expressed by the relationship:

$$x_{mix}(t) = V \cdot \exp\left(2j\pi\left(-f_0 \cdot \tau + \frac{B}{2 \cdot T_{ramp}}\tau - \frac{B}{T_{ramp}} \cdot \tau \cdot t\right)\right) \cdot rect\left(\frac{t - \frac{T_{ramp} + \tau}{2}}{T_{ramp} - \tau}\right)$$

with $f_0$ corresponding to the initial frequency of the generated FMCW radar signal and equal to $f_c - B/2$.

In the device 100, the two generated radar signals have the same initial phases. Indeed, the uncontrolled and random initial phases would make the phase reading of the IF signals impossible to interpret. In order to ensure this phase coherence between the first and second generated radar signals, the device 100 may for example use a dual modulation system.

Figure 5:
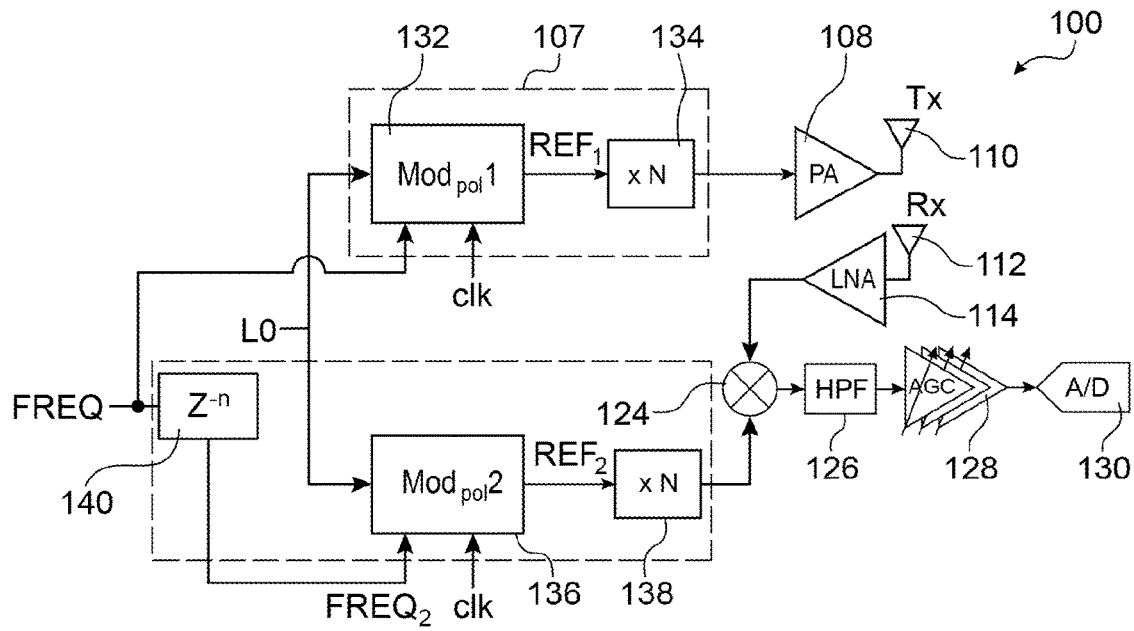
FIGS. 5 and 6 show exemplary embodiments of the radar measuring device according to an embodiment.

FIG. 5 shows a first embodiment of the device 100 using a dual modulation system.

In this first exemplary embodiment, the first generator 107 is formed by a first polar modulator 132 and a first frequency multiplier 134. The first polar modulator 132 receives as input a clock signal clk, a control signal FREQ and a periodic signal LO. The output of the first polar modulator 132, on which a signal $REF_1$ is outputted, is electrically coupled to the input of the first frequency multiplier 134. The output of the first frequency multiplier 134 is coupled to the input of the power amplifier 108.

Furthermore, in this first exemplary embodiment, the second generator 123 is formed by a second polar modulator 136, a second frequency multiplier 138 and a delay circuit 140. The second polar modulator 136 receives as input the clock signal clk, a control signal $FREQ_2$ corresponding to the control signal FREQ to which the delay $\tau_{mix}$ is applied, and the periodic signal LO. The output of the second polar modulator 136, on which a signal $REF_2$ is outputted, is electrically coupled to the input of the second frequency multiplier 138. The output of the second frequency multiplier 138 is coupled to the input of the mixer 124.

By way of example, the first and second polar modulators 132, 136 may be similar to that proposed in document FR 3 100 404 A1.

The periodic signal LO corresponds to a frequency signal $f_{REF}$ generated for example by a local oscillator (not visible in FIG. 5) of the device 100. The first polar modulator 132 will modulate the periodic signal LO from the control signal FREQ, in the form of a sequence of frequency samples, corresponding to the signal $REF_1$. The control signal FREQ is provided to the first modulator 132 at the rate of the clock signal clk of frequency $f_{clk}$. The signal $REF_1$ outputted from the first polar modulator 132 corresponds to a square signal whose frequency increases linearly with time to sweep a frequency band $B_{REF}$ with a central frequency $f_{REF}$.

The second polar modulator 136 receives as input the same frequency samples as the first polar modulator 132 but delayed, via the delay circuit 140, by a configurable number n of periods of the clock signal clk. This new sequence of frequency samples corresponds to the control signal $FREQ_2$. The signal $REF_2$ outputted from the second polar modulator 136 is similar to the signal $REF_1$, that is to say sweeps the frequency band $B_{REF}$ which is centred on the frequency $f_{REF}$, but is delayed by an arbitrarily selected value raw $\tau_{mix} = n/f_{REF}$.

Each of these two signals $REF_1$ and $REF_2$ have their frequencies multiplied by the same value N by the first and second frequency multipliers 134, 138. In order to obtain low $T_{ramp}$ values, the value of the multiplication factor N is advantageously greater than 10. Advantageously, the first and second frequency multipliers 134, 138 may be similar to that proposed in the document FR 3 086 132 A1 which allows obtaining multiplication factors which may be between 25 and 30. The signals obtained at the output of the frequency multipliers 134, 138 may correspond to sinusoidal signals with linear frequency modulation and controlled initial phase, of central frequency $f_c = N \cdot f_{REF}$ and sweeping the frequency band $B = N \cdot B_{REF}$.

The device 100 thus forms an architecture with two circuits for generating short chirps with a controlled initial phase.

Figure 6:
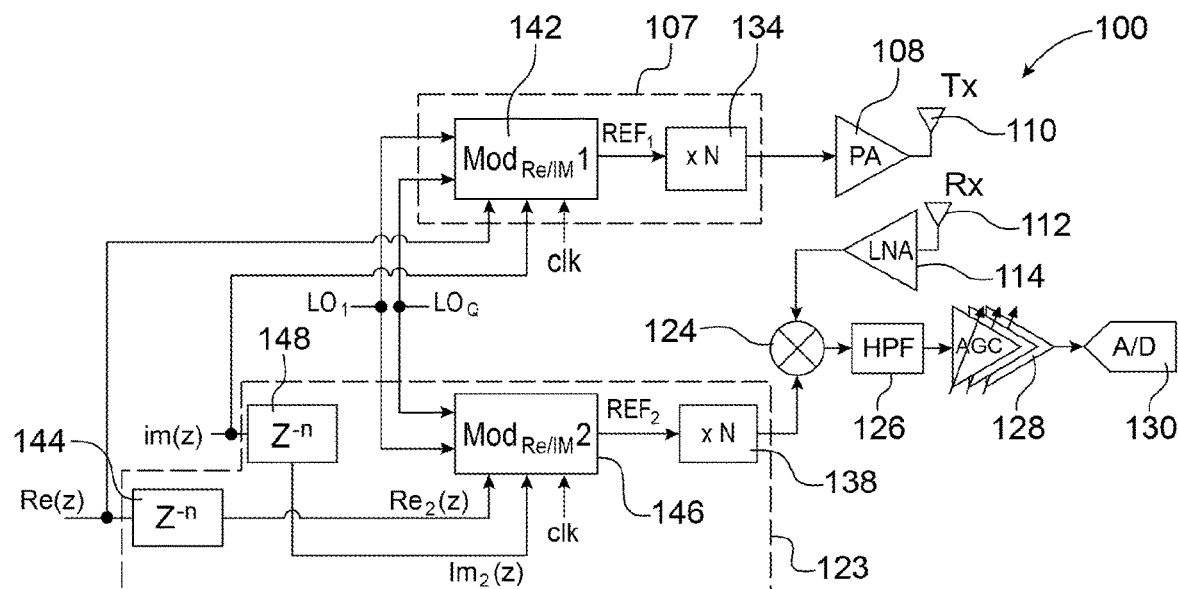

FIG. 6 shows a second exemplary embodiment of the device 100 according to the particular previously described embodiment.

In this second exemplary embodiment, the device 100 includes two Cartesian modulators 142, 146 instead of the polar modulators 132, 136 of the first exemplary embodiment. These modulators 142, 146 receive as inputs two periodic signals $LO_I$ and $LO_Q$ of frequency $f_{REF}$ and phase shifted by 90° relative to each other. The signal $LO_Q$ is phase lagging relative to the signal $LO_I$. These signals correspond to the real (I) and imaginary (Q) portions of a complex signal to be carried out. Each Cartesian modulator 142, 146 also receives as input the clock signal clk as well as digital modulation control signals Re(z) and Im(z) for the first Cartesian modulator 142, and digital modulation control signals $Re_2(z)$ and $Im_2(z)$ for the second Cartesian modulator 146. The digital modulation control signals $Re_2(z)$ and $Im_2(z)$ are similar to the signals Re(z) and Im(z), but delayed, via delay circuits 144 and 148, by a configurable number n of periods of the clock signal clk corresponding to the delay $\tau_{mix}$. These digital inputs, clocked at the frequency of the clock signal $f_{clk}$, contain the samples of the modulations to be performed on the real and imaginary portions $LO_I$ and $LO_Q$ in the form of complex numbers.

Figure 7:
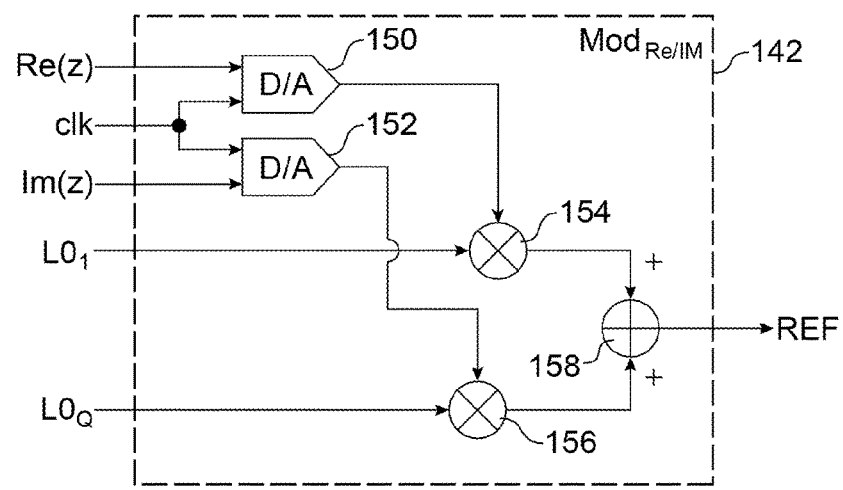
FIG. 7 shows an operating diagram of a Cartesian modulator.

An operating diagram of such a Cartesian modulator is shown in FIG. 7. In the example of FIG. 7, the Cartesian modulator will convert these digital commands into analog signals using digital-analog converters 150, 152 and carry out an analog mixing to independently modulate $LO_I$ and $LO_Q$ with each of the analog signals obtained at the output of the converters 150, 152, thanks to mixers 154, 156. These two modulated signals are then added by an adder 158 to obtain the desired modulated complex signal which finally constitutes the output signal of the Cartesian modulator.

The first Cartesian modulator 142 is used to generate the first radar signal intended to be transmitted by the device 100. The signal $REF_1$ provided at the output of the first Cartesian modulator 142 is identical to that outputted by the first polar modulator 132, and the signal $REF_2$ outputted from the second Cartesian modulator 146 is identical to that outputted by the second polar modulator 136.

The two exemplary embodiments described above form direct modulation systems which are advantageous relative to the systems of the closed-loop oscillator (PLL) type which undergo a setup time which does not allow the phase trajectory to be controlled. In the two exemplary embodiments described above, the modulation carried out in open loop from a common clock (clk) makes this solution insensitive to the variation of the initial conditions.

Figures 3, 4:
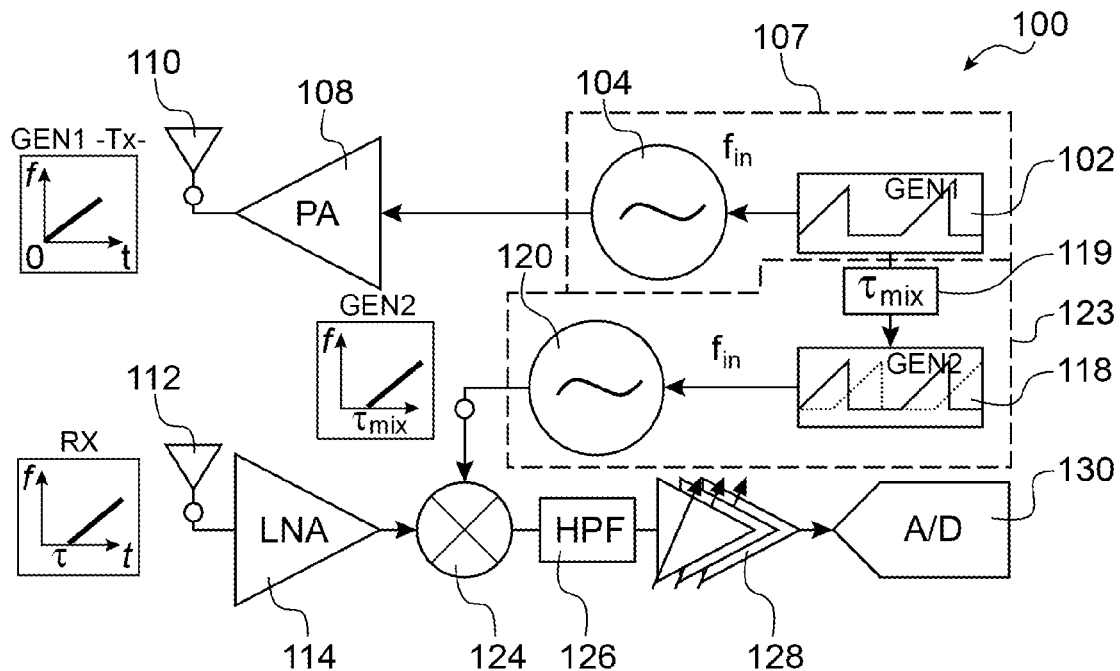
FIG. 3 schematically shows a radar measuring device according to an embodiment.
FIG. 4 shows the characteristics f(t) of chirps used in the radar measuring device according to an embodiment.

As shown in FIG. 4, mixing the received echoes with a chirp delayed by $\tau_{mix}$ rather than with the chirp transmitted at t=0 results in low IF frequencies for the flight time values $\tau_k$ close to $\tau_{mix}$. These low IF frequencies are observed with wider time windows (the duration of coexistence of the echoes and the second output signal, equal to $T_{ramp} - \tau_k + \tau_{mix}$, is greater than the duration of coexistence of the echoes and the first output signal, equal to $T_{ramp} - \tau_k$), limiting the obtained windowing effects.

This device 100 is therefore well adapted for capturing a set of echoes having flight times $\tau_k$ close to a given reference value $\tau_{mix}$, that is to say for observing objects at distances $R_k$ close to a reference distance $R_{mix} = c \cdot \tau_{mix}/2$. By selecting a given $\tau_{mix}$ value and reduced IF frequency values, the device 100 carries out a distance measurement on a specific zone or region of the scene. By knowing a priori the zones of the scene which are actually occupied by reflectors, the device 100 allows carrying out and repeating measurements based on short chirps, at low sampling frequency and without time windowing effects.

For short-range applications, for example in the range of ten meters, the value of $\tau_{mix}$ might be selected as being non-zero and less than 100 ns.

It should be noted that the first and second generators 107, 123 have decorrelated phase noises.

This operation of the device 100 requires a priori knowledge of the times of flight $\tau_k$ to be measured in order to select the delays $\tau_{mix}$ which are the most suitable possible for the scene. The device 100 may be used to carry out a sequence of measurements, the first being used to determine a rough occupation of the scene, at low spatial resolution. This first step allows the a priori construction on the zones in space manifesting the presence of energy (interpreted by the radar as a presence of a reflector). The following measurements, called "focusing", may be used to "zoom in" on the pre-detected targets with a maximum resolution and a large SNR, to allow object tracking applications by short chirp measurements, and therefore with low energy consumption, and on which a phase monitoring will be performed to address small movement detection applications.

An observation method implemented using the device 100 is described below.

In order to determine which values to choose for the delays $\tau_{mix}$, an observation of the entire scene to be observed is carried out during a first measuring step. For this, a measurement equivalent to a standard FMCW measurement is carried out using a transmission chirp and a reference chirp used in the mixer 124 which are generated at the same time, that is to say with $\tau_{mix}=0$. In order to not use the high sampling rate converter 130 and have a good control of the SNR, the elements of the device 100 (the filters 126 and 128 in the present case) are configured so that the IF frequencies to be measured remain in an acquisition band $B_{acq}$ of only a few MHz. This band $B_{acq}$ is determined by the following equation:

$$B_{acq} = 2 \cdot \frac{B_1}{T_{ramp,1}} \cdot \tau_{max} = 2 \cdot \frac{B_1}{T_{ramp,1}} \cdot \frac{2 \cdot R_{max}}{c}$$

with:

$\tau_{max}$ corresponding to the flight time associated with the desired range $R_{max}$ of the device 100;

$B_1$ the frequency band swept by the chirp (the first and second radar signals) generated by the device 100;

$T_{ramp,1}$ the sweep duration of the band $B_1$.

The association of the filters 126 and 128 forms a band-pass filter with variable cut-off frequencies allowing adjusting, for each measurement, the value of the band in which the radar signals will be observed and filtering the noise outside this band.

In order to limit the value of this band $B_{acq}$, it is possible to reduce the band $B_1$ of the chirp used in this first step and/or increase its duration $T_{ramp,1}$. This reduction of the band $B_{acq}$ will limit the spatial resolution of the measurement carried out. This first measurement will therefore not correspond to a high resolution measurement of the scene, but will allow detecting which zones are occupied by one or more reflectors.

Figure 8:
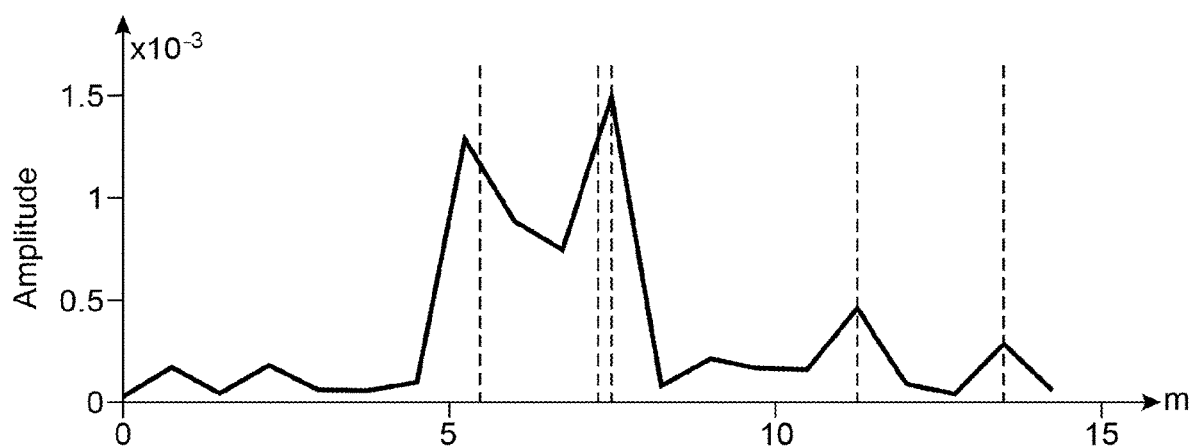
FIG. 8 shows an output signal obtained during a first radar measurement implemented by the device 100.

FIG. 8 shows an example of signal obtained at the output of the converter 130 during this first measuring step for a scene comprising five reflectors placed at distances comprised between $R_{min}=0$ m and $R_{max}=15$ m. The dotted lines shown in this figure represent the actual positions of the five reflectors. In this example, a chirp of duration $T_{ramp,1}=1$ μs and bandwidth $B_1=200$ MHz is used. The corresponding acquisition band is equal to 40 MHz and the SNR obtained at R=15 m is equal to −7.3. The obtained output signal testifies to the presence of the reflectors, as shown by the peaks present around the simulated positions of each object. However, the used weak band $B_1$ does not allow distinguishing the two reflectors placed around R=7 m. This first measurement allows distinguishing four zones of occupation, but does not allow determining how many objects are present in each of these zones. This first measurement therefore gives a first estimate of the distances $R_k$ at which the reflectors are located in the scene observed by the device 100. Thus, the low spatial resolution selected for this first measurement does not, however, allow distinguishing whether several objects are located within a radius of size $c/2 \cdot B_1$ around these distances $R_k$.

The table below indicates, for each of the five reflectors used in the example described above, its actual distance $R_k$ relative to the device 100 and the corresponding flight time $\tau_k$, the estimated distance $\widehat{R_k}$ of each of the reflectors from the frequencies $f_{IF,k}$ measured in the output signal of the converter 130 during the implementation of the first measuring step and the relationship $$f_{IF,k} = -\frac{B_1}{T_{ramp}} \cdot \tau_k = -\frac{B_1}{T_{ramp}} \cdot \frac{2 \cdot R_k}{c},$$

and, for each of the reflectors, the choice of the delay $\tau_{mix,k}$ which will be applied in the next step to observe in more detail each of the detected zones as being occupied by one of the reflectors and which is given by the relationship $$\tau_{mix,k} = \frac{2\widehat{R_k}}{c} - \frac{1}{2B_2}.$$

The frequencies $f_{IF\_k}$ are for example measured from the output signal of the converter 130 which is sampled. A discrete Fourier transform may be applied to this signal to separate its frequency components which correspond to the different beat frequencies. Detection and estimation operations, for example according to the CFAR ("Constant False Alarm Rate") algorithm, may then be applied to the frequency signal to detect the frequency peaks present in this signal.

TABLE 1

| Reflector No. | Actual distance $R_k$ | Flight time $\tau_k$ | Estimated distance $\widehat{R_k}$ | Calculated delay $\tau_{mix,\,k}$ |
|---|---|---|---|---|
| 1 | 5.475 m | 36.53 ns | 5.25 m | 32.5 ns |
| 2 | 7.275 m | 48.53 ns | 7.5 m | 47.5 ns |
| 3 | 7.5 m | 50.03 ns | 7.5 m | 47.5 ns |
| 4 | 11.25 m | 75.05 ns | 11.25 m | 72.5 ns |
| 5 | 13.5 m | 90.06 ns | 13.5 m | 87.5 ns |

Several second measuring steps are then implemented to observe each of the detected zones as being occupied during the first measuring step. These second steps will allow identifying the positions of the reflectors on the scene by placing them on a discretised distance axis, whose elements are called "range bin" and correspond to a range of distance values. The distance separating the centres of two consecutive range bins is determined by the bandwidth B of the used chirp and is equal to $c/(2 \cdot B)$. Each bin range is associated with an IF frequency according to the following relationship linking any frequency f to a distance R:

$$R = \frac{c \cdot T_{ramp}}{2 \cdot B} \cdot f$$

By detecting an IF component in an output signal of device 100, it is possible to deduce therefrom that a reflector is present on the bin range associated with this frequency. The number of observed range bins determines the range of the distances supervised by the measurement, that is to say the size of the observation window, and depends on the acquisition band of the observed IF frequencies, $B_{acq}$.

The position of this window on the distance axis is determined by the value of $\tau_{mix,k}$. If an activity zone around the range bin which is centred on a distance $R_k$ is detected, a chirp which will aim at scanning this zone of size $c/(2 \cdot B_1)$ centred on $R_k$ with a high spatial resolution is sent by the device 100. A delay value $\tau_{mix,k}$ is selected so that the measured IF frequencies are adapted to this zone, according to the equation:

$$\tau_{mix,k} = \frac{2 \cdot R_k}{c} - \frac{1}{2 \cdot B}$$

which allows concentrating the observation on the signals originating from objects placed between $$R_{min} = R_k - \frac{1}{2} \cdot \frac{c}{2B} \text{ and } R_{max} = R_k + \frac{1}{2} \cdot \frac{c}{2B}.$$

In order to increase the spatial resolution of the second measurements relative to the first measurement, a frequency band $B_2$ which is higher than the band $B_1$ is selected for the new chirps used for these second steps. By keeping the same acquisition band $B_{acq}$ of IF frequency as for the previous measurement, band $B_2$ may be defined as:

$$B_{acq} = 2 \cdot \frac{B_1}{T_{Ramp,1}} \cdot \frac{2 \cdot R_{max}}{c} = 2 \cdot \frac{B_2}{T_{Ramp,2}} \cdot \frac{1}{B_1}$$

and therefore $$B_2 = \frac{B_{acq} \cdot B_1 \cdot T_{ramp,2}}{2}$$

The IF frequencies from signals outside this zone, which are larger than the acquisition band $B_{acq}$, are filtered by the filters 126 and 128.

In the preceding example where $B_1=200$ MHz, considering that $T_{ramp,1}=T_{ramp,2}=1$ µs, band chirps $B_2=4$ GHz are used. With such parameters, the distance window observed by the device 100 (that is to say the difference between the minimum distance and the maximum observable distance) is 75 cm. The corresponding acquisition band is equal to 40 MHz and the SNR obtained at R=15 m is equal to −6.9.

Figure 9:
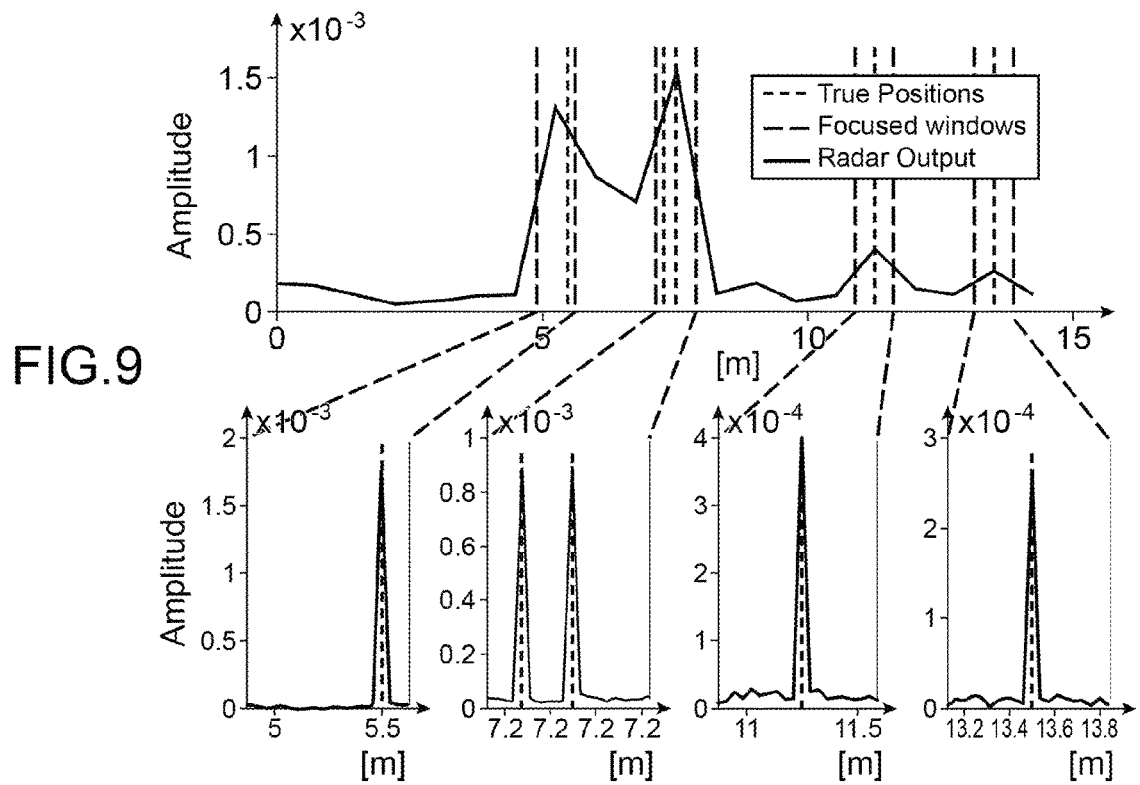
FIG. 9 shows output signals obtained during second radar measurements implemented by the device 100.

FIG. 9 shows the signals obtained at the output of the converter 130 during these second measuring steps. The four curves visible in this figure correspond to the signals obtained at the output of the converter 130 for each of the previously estimated delays $\tau_{mix,k}$ The second of these four curves shows that a sufficient spatial resolution is obtained to distinguish the reflectors which occupied the zone centred about $R_k=7,5$ m.

Once these second measuring steps have been carried out, it is possible to define once again delay values $\tau_{mix}$ for each reflector detected during the implementation of the second steps. It is for example possible to carry out a new series of measurements in order to focus the observation on areas of size $c/(2 \cdot B_2)$ which are centred on all $R_k$ detected during the second measuring steps, with the desired maximum spatial resolution.

The table below indicates, for each of the five reflectors detected in the example described above, its real distance $R_k$ relative to the device 100 and the corresponding flight time $\tau_k$, the estimated distance $\widehat{R_k}$ of each of the reflectors from the frequencies $f_{IF,k}$ which are measured in the output signals of the converter 130 obtained by implementing the second measuring steps and from the relationship:

$$f_{IF,k} = -\frac{B_2}{T_{ramp}} \cdot \tau_k = -\frac{B_2}{T_{ramp}} \cdot \frac{2 \cdot R_k}{c},$$

and, for each of the reflectors, the selection of the delay $\tau_{mix,k}$ which will be applied to the next steps to observe in more detail each of the detected zones as being occupied by one of the reflectors and which is given by the relationship $$\tau_{mix,k} = \frac{2\widehat{R_k}}{c} - \frac{1}{2B_3}.$$

TABLE 2

| Reflector No. | Actual distance $R_k$ | Flight time $\tau_k$ | Estimated distance $\widehat{R_k}$ | Calculated delay $\tau_{mix,k}$ |
|---|---|---|---|---|
| 1 | 5.475 m | 36.53 ns | 5.475 m | 36.33 ns |
| 2 | 7.275 m | 48.53 ns | 7.275 m | 48.33 ns |
| 3 | 7.5 m | 50.03 ns | 7.5 m | 49.83 ns |
| 4 | 11.25 m | 75.05 ns | 11.25 m | 74.83 ns |
| 5 | 13.5 m | 90.06 ns | 13.5 m | 89.83 ns |

For these third measuring steps, new chirps are sent and the IF deviations they produce with signals delayed by new values $\tau_{mix,k}$ are measured. For these third steps, a bandwidth $B_3$ which is greater than $B_2$ is used to obtain a higher spatial resolution. Finally, the measured IF frequencies are filtered to visualise only areas which are centred on the distances $R_k$ estimated by the previous measurements and of size $c/(2 \cdot B_3)$. In the example described herein, a bandwidth $B_3=6$ GHz is selected, with $T_{ramp,3}=1$ µs. With such parameters, the distance window observed by the device 100 is 7.5 cm. The corresponding acquisition band is equal to 6 MHz and the obtained SNR at R=15 m is equal to +3.1.

Figure 10:
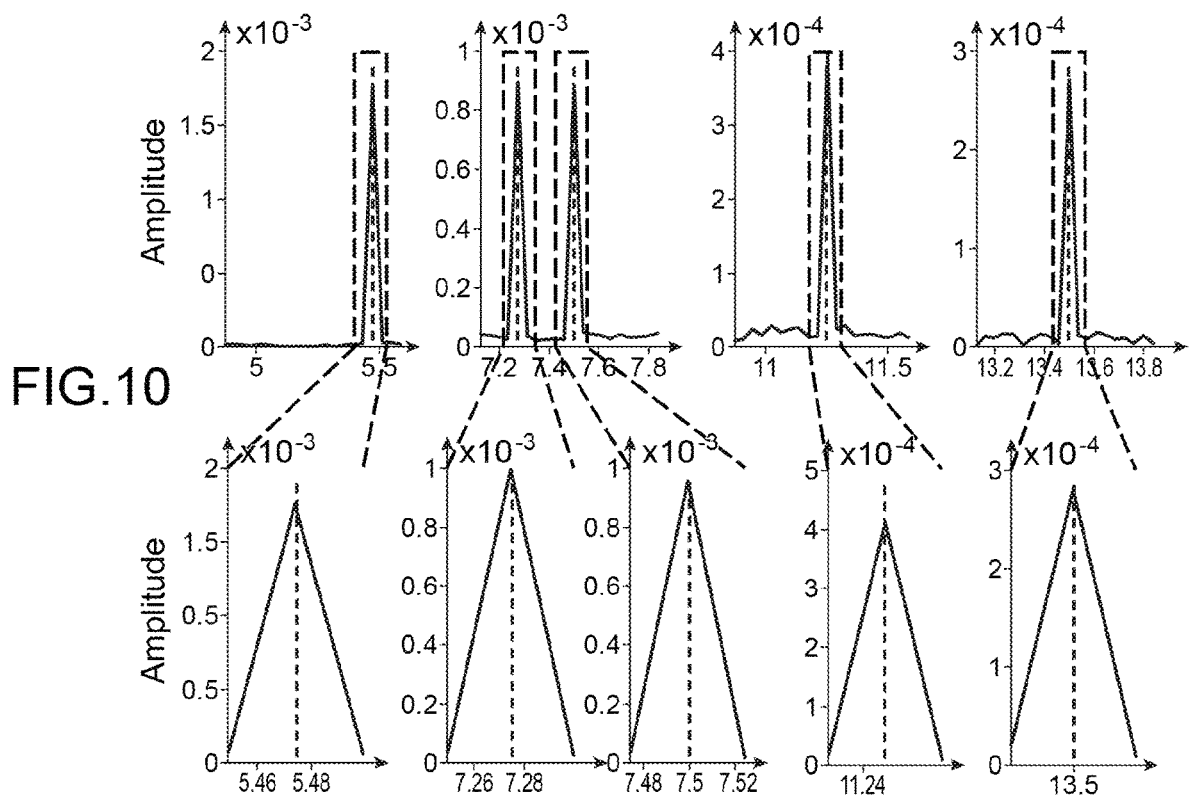
FIG. 10 shows output signals obtained during third radar measurements implemented by the device 100.

FIG. 10 shows the signals obtained at the output of the converter 130 during these third measuring steps. The five curves shown in this Figure correspond to the signals obtained at the output of the converter 130 for each of the previously estimated delays $\tau_{mix,k}$ The size of the areas observed in these third steps is very small, and the acquisition band was selected to visualise only three different range bins. However, the preceding measuring steps allowed ensuring that no target was missed: these third steps correspond to a scan by reflector, and the rest of the scene is no longer observed.

Considering that each of the identified reflectors corresponds to an individual on whom a monitoring of vital signals must be carried out, the third measuring steps may then be repeated at the frequency $f_{frame}$, or "Frame Rate", adapted to the monitoring which is carried out, for example between 1 Hz and 5 Hz in the case of a heart rate monitoring, or between 0.1 Hz and 0.5 Hz in the case of respiratory rate monitoring. Repeating these steps allows evaluating the displacements of each reflector over several seconds. The lower the number of reflectors, the lower the time required to perform these measuring steps. In order to measure the small variations in distance generated for example by a heartbeat or breathing, the phase variation of the IF signals is measured. This phase variation measurement may be performed by digital processing. For example, by carrying out an FFT (Fast Fourier transform) on the output signal of the converter 130, a representation of this signal in the frequency domain is obtained. It is then possible to carry out a discretisation of this signal in "frequency bins" with a pitch of $1/T_{ramp}$ (or in "range bin"). If an IF frequency is detected in a bin range, the complex value associated therewith is read and it is possible to deduce the phase therefrom by calculating the arc tangent of its imaginary portion on its real portion. These steps are repeated for all other IF frequencies present in the spectrum of this same radar measurement. These operations will be repeated at the frequency $f_{frame}$ to finally observe the variations of the phases of each of these IF frequencies over time.

The successive focusing steps allow reducing the sizes of the observation windows so as to compensate for the influence of the increase in frequency band B swept by the chirp on the acquisition band $B_{acq}$, while ensuring not to miss detecting any of the reflectors present in the scene. The measurements are gradually focused on the detected reflectors, by ensuring limiting the acquisition bands, and by extending the noise powers. The final measuring steps, the most focused, will also be those which will benefit from the best SNR.

Figure 11:
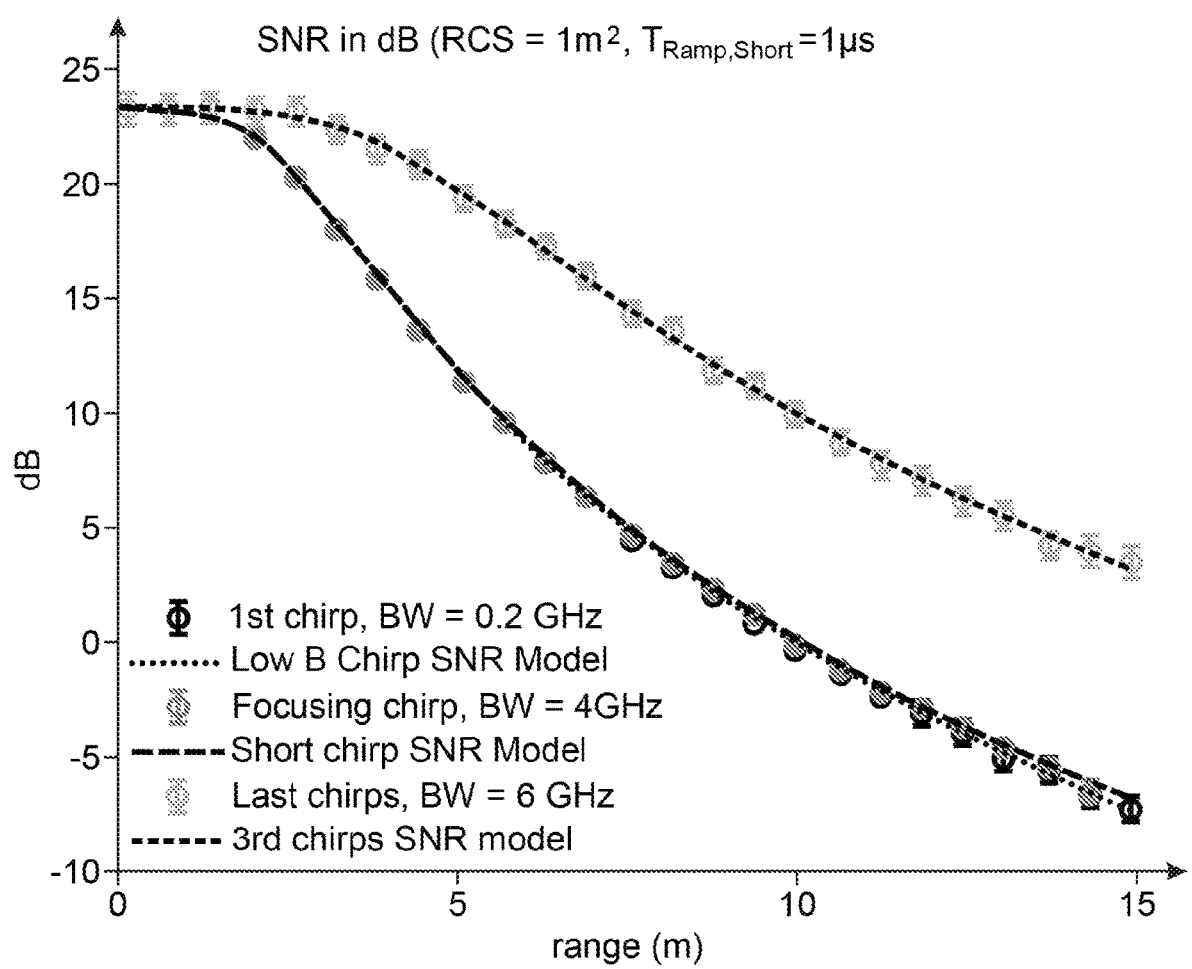
FIG. 11 shows the SNRs obtained for several measuring steps implemented by the device 100.

FIG. 11 shows the SNRs obtained for each of the three measuring steps of the previously described example.

The SNR values are however adjustable via adjusting the acquisition bands of each measuring step by modifying the durations $T_{ramp}$. Increasing this duration $T_{ramp}$ allows decreasing the required $B_{acq}$ values, and therefore increasing the SNR curves. Increasing the durations $T_{ramp}$ during the first two measuring steps by a certain factor could thus allow reducing the acquisition bands by this same factor, and therefore multiplying the SNRs by this same factor. It is for example possible to configure the device 100 to meet specifications specifying a minimum SNR to be observed at the distance $R_{max}$, this SNR usually being linked to a probability of detection of a reflector by the radar.

In this example, the IF frequencies are observed over 3 range bins. The $\tau_{mix,k}$ values have been selected in order to ensure that these IF frequencies are centred in the observation windows. If one of the reflectors were to be displaced, we would then see the displacement of its corresponding IF frequency out of the centre of the observation window thereof. Indeed, if a reflector approaches the device 100, then the measured IF frequency will gradually decrease. The more the flight time τ associated with this distance decreases, the closer it approaches the value of the delay $\tau_{mix}$ used to observe this reflector. This frequency will eventually change bin range and will be displaced to the left end of the window accordingly. Conversely, if the reflector moves away from device 100, its associated IF frequency will shift until it arrives at the range bin of the greatest distance from the monitored window. It will then be necessary to update the $\tau_{mix}$ value which is used to visualise this zone, to readapt the window and re-centre it on the new position of the reflector.

When the device 100 is used for example for monitoring vital signs, the millimetre movements of the rib cages of the monitored subjects are observed through the phase variations of the IF signals associated with these subjects. When the measurements are carried out without varying the $\tau_{mix}$ values, and that the reflectors do not change bin range, the phase variations observed in the IF signals are well representative of the movements of the monitored subjects.

When a moving target reflector leaves the used observation window, the $\tau_{mix}$ value is modified in order to readapt the observation window to re-centre the IF signature associated with the reflector therein. This change in $\tau_{mix}$ value is carried out when the IF frequency becomes too low (in the case of bringing the reflector closer relative to the device 100) or too high (in the case of a distance from the reflector relative to the device 100) and is therefore no longer present in the observed window.

Moreover, by selecting a ratio $f_c/B=K$, where K is an integer which is greater than or equal to 10, it is not necessary to carry out a phase compensation because the influence of the change in $\tau_{mix}$ value on the phase signal is negligible.

Furthermore, the choice of a good SNR allows ensuring a good probability of detection.

The invention claimed is:

1. A radar measuring device, comprising:
a first generator of a first periodic radar signal whose frequency varies linearly, over at least one portion $T_{ramp}$ of a period, in a frequency band;
a transmit antenna coupled to an output of the first generator and configured to transmit the first radar signal;
a second generator of a second periodic radar signal (1) whose frequency varies linearly, over said portion $T_{ramp}$ of the period, in the frequency band, (2) which is generated with a constant phase or a same start-up phase as the first radar signal, and (3) has, relative to the first radar signal, a configurable delay $\tau_{mix}$;
a receive antenna configured to receive at least one echo of the first radar signal; and
a mixer comprising a first input coupled to the receive antenna and a second input coupled to an output of the second generator, wherein:
the first generator includes a first polar modulator configured to receive, on a first input, a first periodic signal to be frequency modulated, receive, on a second input, a first control signal comprising a digital sequence of frequency samples, receive, on a third input, a clock signal, and perform a modulation of the first periodic signal by the first control signal at a frequency of the clock signal; and
the second generator includes a second polar modulator configured to receive, on a first input, the first periodic signal to be frequency modulated, receive, on a second input, a second control signal comprising said digital sequence of frequency samples delayed by the configurable delay $\tau_{mix}$, which is equal to an integer number of periods of the clock signal, receive, on a third input, the clock signal, and perform a modulation of the first periodic signal by the second control signal at the frequency of the clock signal.

2. The radar measuring device according to claim 1, wherein an output of the first polar modulator is coupled to an input of a first frequency multiplier, the first radar signal corresponding to the signal to be output from the first frequency multiplier, and
wherein an output of the second polar modulator is coupled to a input of a second frequency multiplier, the second radar signal corresponding to the signal to be output from the second frequency multiplier.

3. The radar measuring device according to claim 1, further comprising, coupled to an output of the mixer, a high pass filter, which is coupled in series to a variable cut-off frequency and a gain filter.

4. The radar measuring device according to claim 1, further comprising an analog digital converter comprising an input that is coupled to an output of a variable cut-off frequency and a gain filter.

5. A radar measuring method implemented with at least one radar measuring device according to claim 1, the method comprising:
selecting a first value of the configurable delay $\tau_{mix}$, of a first value $B_1$ of the frequency band and of a first $T_{ramp}$ value; and
a first radar measuring step implemented with the radar measuring device, which is configured with the first value of the configurable delay $\tau_{mix}$ and the first value $B_1$.

6. The radar measuring method according to claim 5, wherein at least one of:
the first value of the configurable delay $\tau_{mix}$ is equal to 0;
the first value $B_1$ is between 200 MHz and 2 GHz; or
the first $T_{ramp}$ value is between 1 µs and 10 µs.

7. The radar measuring method according to claim 5, further comprising, after the implementation of the first radar measurement step:
measuring, in a spectrum of the output signal of the radar measuring device obtained during the first radar measurement step, one or more frequency peaks $f_{IF,k}$, k being an integer greater than or equal to 1, each representative of a presence of at least one reflector at a given distance from the radar measuring device;
calculating, for the or each of the frequency peaks $f_{IF,k}$, d an estimate $\tilde{R}_k$ of said given distance according to the equation $$\tilde{R}_k = -\frac{f_{IF,k} \cdot T_{ramp}}{B_1} \cdot \frac{c}{2},$$

with c corresponding to the speed of light in a vacuum;
selecting a second value $B_2 > B_1$ of the frequency band;
calculating one or more second values $\tau_{mix,k}$ of the configurable delay $\tau_{mix}$ according to the equation $$\tau_{mix,k} = \frac{2\tilde{R}_k}{c} - \frac{1}{2B_2};$$

and
one or more second radar measuring steps, each implemented with the radar measuring device configured with the or one of the second values $\tau_{mix,k}$ and the second value $B_2$.

8. The radar measuring method according to claim 7, wherein the second value $B_2$ is between 2 GHz and 4 GHz.

9. The radar measuring method according to claim 7, further comprising, after the implementation of the one or more second radar measuring steps:
measuring, in the spectrum of the or each output signal of the radar measuring device obtained during the or each of the one or more second radar measurement steps, one or more frequency peaks $f_{IF,k}$;
calculating, for the or each of the frequency peaks $f_{IF,k}$, an estimate $\tilde{R}_k$ of said given distance according to the equation $$\tilde{R}_k = -\frac{f_{IF,k} \cdot T_{ramp}}{B_2} \cdot \frac{c}{2}$$

selecting a third value $B_3 > B_2$ of the frequency band;
calculating one or more third delay values $\tau_{mix,k}$ of the configurable delay $\tau_{mix}$ according to the equation $$\tau_{mix,k} = \frac{2\tilde{R}_k}{c} - \frac{1}{2B_3};$$

and
one or more third radar measuring steps each implemented with the radar measuring device configured with the or one of the third delay values $\tau_{mix,k}$ and the third value $B_3$.

10. The radar measuring method according to claim 9, wherein the third value $B_3$ is between 4 GHz and 6 GHz.

11. The radar measuring method according to claim 7, wherein the one or more second radar measuring steps are repeated at a frequency between 1 Hz and 5 Hz in a case of a method implemented to follow a heart rate, or between 0.1 Hz and 0.5 Hz in a case of a method implemented to follow a respiratory rate.

12. A radar measuring device, comprising:
a first generator of a first periodic radar signal whose frequency varies linearly, over at least one portion $T_{ramp}$ of a period, in a frequency band;
a transmit antenna coupled to an output of the first generator and configured to transmit the first radar signal;
a second generator of a second periodic radar signal (1) whose frequency varies linearly, over said portion $T_{ramp}$ of the period, in the frequency band, (2) which is generated with a constant phase or a same start-up phase as the first radar signal, and (3) has, relative to the first radar signal, a configurable delay $T_{mix}$;
a receive antenna configured to receive at least one echo of the first radar signal; and
a mixer comprising a first input coupled to the receive antenna and a second input coupled to an output of the second generator, wherein:
the first generator includes a first Cartesian modulator configured to receive, on a first input, a first periodic signal to be frequency modulated, receive, on a second input, a second periodic signal to be frequency and quadrature modulated with the first periodic signal, receive, on a third input, a first control signal comprising a first digital sequence of frequency samples, receive, on a fourth input, a second control signal comprising a second digital sequence of frequency samples, receive, on a fifth input, a clock signal, and perform a modulation of the first and second periodic signals respectively by the first and second control signals at a frequency of the clock signal; and
the second generator includes a second Cartesian modulator configured to receive, on a first input, the first periodic signal to be frequency modulated, receive, on a second input, the second periodic signal to be frequency and quadrature modulated with the first periodic signal, receive, on a third input, a third control signal comprising the first digital sequence of frequency samples delayed by the configurable delay $\tau_{mix}$, which is equal to an integer number of periods of the clock signal, receive, on a fourth input, a fourth control signal comprising the second digital sequence of frequency samples delayed by the configurable delay $\tau_{mix}$, receive, on a fifth input, the clock signal, and perform a modulation of the first and second periodic signals respectively by the third and fourth control signals at the clock signal frequency.

13. The radar measuring device according to claim 12, wherein an output of the first Cartesian modulator is coupled to an input of a first frequency multiplier, the first radar signal corresponding to the signal to be output from the first frequency multiplier, and wherein an output of the second Cartesian modulator is coupled to a input of a second frequency multiplier, the second radar signal corresponding to the signal to be output from the second frequency multiplier.

14. The radar measuring device according to claim 12, further comprising, coupled to an output of the mixer, a high pass filter, which is coupled in series to a variable cut-off frequency and a gain filter.

15. The radar measuring device according to claim 12, further comprising an analog digital converter comprising an input that is coupled to an output of a variable cut-off frequency and a gain filter.

16. A radar measuring method implemented with at least one radar measuring device according to claim 12, the method comprising:

selecting a first value of the configurable delay $\tau_{mix}$, of a first value $B_1$ of the frequency band and of a first $T_{ramp}$ value; and a first radar measuring step implemented with the radar measuring device, which is configured with the first value of the configurable delay $\tau_{mix}$ and the first value $B_1$.

17. The radar measuring method according to claim 16, wherein at least one of:

the first value of the configurable delay $\tau_{mix}$ is equal to 0;
the first value $B_1$ is between 200 MHz and 2 GHz; or
the first $T_{ramp}$ value is between 1 µs and 10 µs.

18. The radar measuring method according to claim 16, further comprising, after the implementation of the first radar measurement step:

measuring, in a spectrum of the output signal of the radar measuring device obtained during the first radar measurement step, one or more frequency peaks $f_{IF,k}$, k being an integer greater than or equal to 1, each representative of a presence of at least one reflector at a given distance from the radar measuring device;

calculating, for the or each of the frequency peaks $f_{IF,k}$, d an estimate $\bar{R}_k$ of said given distance according to the equation $$\bar{R}_k = -\frac{f_{IF,k} \cdot T_{ramp}}{B_1} \cdot \frac{c}{2},$$

with c corresponding to the speed of light in a vacuum;
selecting a second value $B_2 > B_1$ of the frequency band;
calculating one or more second values $\tau_{mix,k}$ of the configurable delay $\tau_{mix}$ according to the equation $$\tau_{mix,k} = \frac{2\bar{R}_k}{c} - \frac{1}{2B_2};$$

and one or more second radar measuring steps, each implemented with the radar measuring device configured with the or one of the second values $\tau_{mix,k}$ and the second value $B_2$.

19. The radar measuring method according to claim 18, further comprising, after the implementation of the one or more second radar measuring steps:

measuring, in the spectrum of the or each output signal of the radar measuring device obtained during the or each of the one or more second radar measurement steps, one or more frequency peaks $f_{IF,k}$;

calculating, for the or each of the frequency peaks $f_{IF,k}$, an estimate $\bar{R}_k$ of said given distance according to the equation $$\bar{R}_k = -\frac{f_{IF,k} \cdot T_{ramp}}{B_2} \cdot \frac{c}{2}$$

selecting a third value $B_3 > B_2$ of the frequency band;
calculating one or more third delay values $\tau_{mix,k}$ of the configurable delay $\tau_{mix}$ according to the equation $$\tau_{mix,k} = \frac{2\bar{R}_k}{c} - \frac{1}{2B_3};$$

and one or more third radar measuring steps each implemented with the radar measuring device configured with the or one of the third delay values $\tau_{mix,k}$ and the third value $B_3$.

20. The radar measuring method of claim 19, wherein the second value $B_2$ is between 2 GHz and 4 GHz or the third value $B_3$ is between 4 GHz and 6 GHz, and the one or more second radar measuring steps are repeated at a frequency between 1 Hz and 5 Hz in a case of a method implemented to follow a heart rate, or between 0.1 Hz and 0.5 Hz in a case of a method implemented to follow a respiratory rate.

* * * * *